United States Patent [19]

Janeiro

[11] Patent Number: 5,085,452
[45] Date of Patent: Feb. 4, 1992

[54] INTERCHANGEABLE TOWING BALL ASSEMBLY

[76] Inventor: Joseph J. Janeiro, 220 Hopper St., Hackensack, N.J. 07601

[21] Appl. No.: 572,691

[22] Filed: Aug. 27, 1990

[51] Int. Cl.$^5$ .............................................. B62D 1/06
[52] U.S. Cl. .................................. 280/511; 280/416.1
[58] Field of Search .................. 280/511, 416.1, 415.1, 280/512, 513

[56] References Cited

U.S. PATENT DOCUMENTS

| | | | |
|---|---|---|---|
| 3,434,741 | 3/1969 | Grant | 280/511 X |
| 4,230,336 | 10/1980 | Avrea et al. | 280/511 X |
| 4,433,854 | 2/1984 | Smith | 280/511 |
| 4,662,647 | 5/1987 | Calvert | 280/511 X |
| 4,938,496 | 7/1990 | Thomas et al. | 280/511 |

Primary Examiner—Mitchell J. Hill
Attorney, Agent, or Firm—Samuelson & Jacob

[57] ABSTRACT

A tractor ball assembly to be mounted on the tongue at the rear end of the tractor having a plurality of balls to match the variously-sized sockets commonly used. The ball is mounted on a base which rests on the tractor tongue. Frusto-conical sections of identical size and shape diamatrically opposed are cut in each ball and the upper side of the base has a surface complementary to the surface of one of the frusto-conical sections. A bolt, the under side of the head of which is a surface complementary to the ball frusto-conical surfaces fits into aligned holes in the ball, base and tongue and upon being tightened keeps the ball from slipping with respect to the base and/or the bolt.

4 Claims, 2 Drawing Sheets

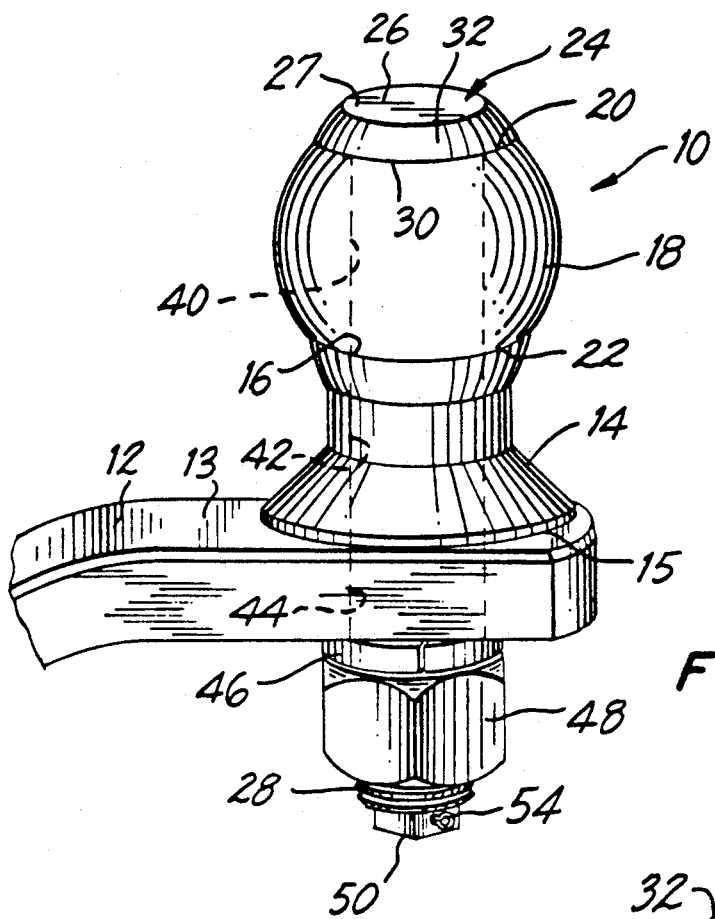
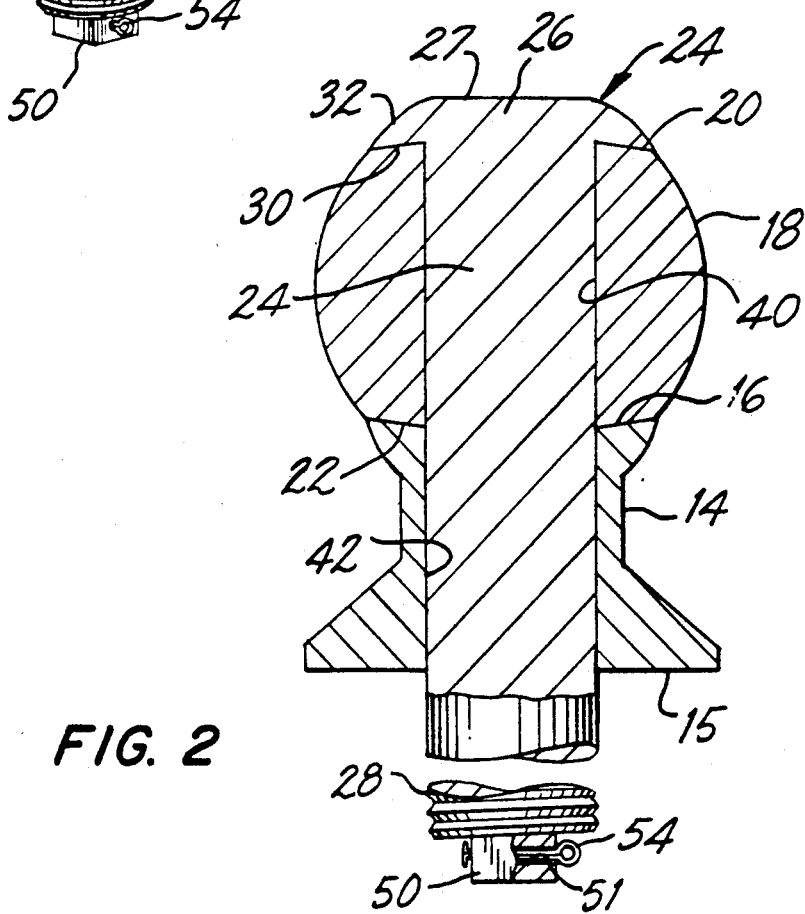
FIG. 1
FIG. 2

INTERCHANGEABLE TOWING BALL ASSEMBLY

The invention relates to a multi-sized towing ball assembly which is affixed to a motion inducing vehicle, such as a tractor, for connection to a socket tongue or coupler which is pivotably affixed to a trailer. The assembly comprises four balls which match the commonly used socket hitches. Only one ball is used at a time and the others are carried in a container in the tractor so that the balls may be interchanged to accommodate the ball to the socket hitch of the trailer.

The problem of providing changeable balls to accommodate to the various socket hitches has been long standing. Many solutions have been proposed but none of them, which are known to the applicant, are as simple to use or as strong as that of the present invention.

U.S. Pat. No. 4,456,279 to Dirck covers a trailer ball assembly made to be used with socket hitches of different sizes. The several balls are mounted on a carousel and the appropriate ball is moved into position to receive the coupler of the trailer. The system described is much more complex in construction than that of the present invention and requires a special mount on the tractor.

U.S. Pat. No. 4,522,421 to Vance discloses a trailer hitch assembly which permits the use of variously sized balls which are mounted on the vehicle towing tongue, as required. The mechanism is complex and completely different from that of the instant invention since the device utilizes a concealed actuating pin which must be employed in order to change the balls.

U.S. Pat. No. 4,772,039 to Cook shows and describes a reversible ball assembly which has a pair of different sized balls back to back. The device described utilizes a cap which does not match the outermost edge of the end portions of differently sized balls.

The present invention is simple to use and provides a smooth surface to receive all of the standard sockets which are presently used. To obtain good stability and long life, all of the parts of the assembly are of sufficient strength to operate when stresses of the heaviest load are applied without deforming or rupturing any of the parts. In particular, the bolt is strong to enable the assembly to maintain its integrity in all operating environments.

It is a principal object of the invention to provide an interchangeable tractor ball assembly which is simple to use and easy to interchange in the field.

It is a further object of the invention to provide such a device wherein each ball may be mounted with either end at the top since both ends are identical.

It is still another object of the invention to provide balls of various sizes which each have frusto-conical surfaces at both ends to mate with the complementary surface on the base mount and on the under surface of the head of the mounting bolt.

It is a still further object of the invention to provide frusto-conical mating surfaces so that the ball is properly centered, seated and held in place whereby rotation of the ball with respect to the balance of the assembly is precluded.

It is yet another object of the invention to provide a kit to permit ready use of the assembly with the variously-sized sockets now in common use.

These and other objects, advantages, features and uses will be apparent as this description proceeds.

FIG. 1 is a perspective view of the assembly of the invention shown mounted on a vehicle tongue;

FIG. 2 is a vertical section, partly broken away, of the assembly of FIG. 1.

Figure 3:
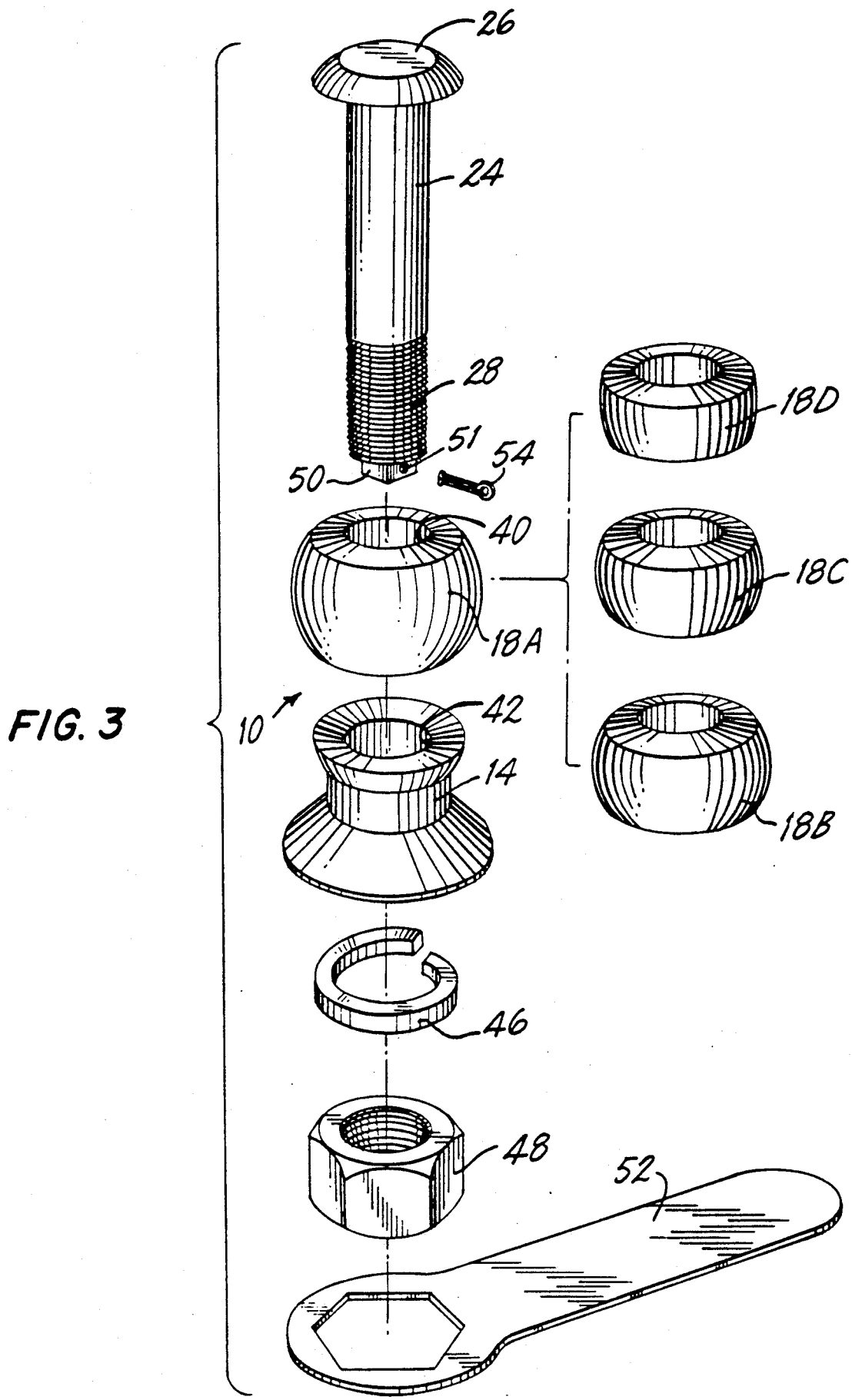
FIG. 3 is a view of the various parts of the assembly kit of the invention.

In the drawing, wherein, for the purpose of illustration, there is shown a preferred embodiment of the invention, the numeral 10 designates an assembly of the invention mounted on a vehicle tongue 12. The assembly 10 comprises a base 14 having a first or upper surface 16 and a second or lower surface 15 (FIGS. 1 and 2), a ball 18 having an upper surface 20 and a lower surface 22, and a bolt 24 having a head 26 and a lower end 28 opposite the head 26. Head 26 has a lower surface 30 and an upper surface 27.

Ball 18 is generally spherical in shape to match a socket, which is mounted on a tongue or coupler at the front end of a trailer, and is shaped and sized to fit the dimensions of the socket. The tongue affixed to the trailer is pivotally mounted so that it moves in a generally horizontal plane to permit the trailer to follow the tractor on turns and under similar driving conditions. In a preferred embodiment of the invention, surface 20 and surface 22 of ball 18 are diametrically opposed and of the same shape and dimensions. Lower surface 30 of head 26 and upper surface 16 of base 14 are sized and shaped to be complementary with surfaces 20 and 22. An opening 40 is cut in ball 18 and an opening 42 is cut in base 14. Openings 40 and 42 are of the same size and are in alignment to permit the bolt 24 to pass therethrough. The tongue is provided with an opening 44 therein which is in alignment with the openings 40 and 42 when the assembly is mounted.

On assembly, base 14 is placed on tongue 12 with surface 15 in contact with surface 13 and with openings 42 and 44 in alignment. Ball 18 is placed on surface 16 of base 14 with surface 22 in contact therewith and with opening 40 in alignment with openings 42 and 44. Bolt 24 is dropped into the aligned openings 40, 42 and 44 so that lower end 28 of the bolt drops through opening 44 in the tongue 12.

The bolt 24 is tightened using a lockwasher 46 and a nut 48. To aid in tightening the bolt a one-half inch square projection 50 unitary with the bolt is provided. The lockwasher 46 and nut 48 are placed on the bolt and finger tightened. Then the wrench 52 (FIG. 3) is applied to the nut and the projection 50 is grasped with pliers or an open-end wrench. The wrench 52 is used to rotate the nut 48 while the pliers keep the bolt from rotating. When the assembly is tightly in place, a cotter pin 51 is placed in an opening 51 in projection 50. Surface 32 of head 26 is shaped to match the outer surface of ball 18 so that a smooth continuity is presented by the surface of the ball.

FIG. 3 is a view of the kit of the assembly 10 of the invention, shown exploded to illustrate the assembly orientation. The figure also shows the various balls which constitute the kit and are made in the sizes to match the socket sizes commonly used in the trucking industry.

Ball 18A is the largest and its size matches a 2 5/16" trailer socket for handling loads up to 12,000 pounds. Ball 18B matches the size of a 2¼" trailer socket and is used for loads up to 10,000 pounds. Ball 18C matches the size of a 2" trailer socket and is used for loads up to 8000 pounds. Ball 18D matches the size of a 1⅞" trailer socket and handles loads up to 6000 pounds.

The diametrically opposed upper and lower surfaces which are cut from each of the balls are identical in size and shape so that the balls can be readily interchanged without the necessity of checking the ball orientation before commencing the assembly. The lower surface of the head of the bolt and the upper surface of the base are complementary in dimensions and shape to the surfaces cut in the balls. The surfaces on the balls are preferably frusto-conical in shape so that the ball does not rotate on the base when the tractor is being turned. The trailer follows the tractor whose tongue or hitch is rigidly mounted to the vehicle while the trailer tongue or coupler is pivoted to move in a generally horizontal plane.

The trailer tongue or coupler is generally in the same plane as the tongue of the tractor when the tractor and trailer are in motion. The trailer tongue rotates in response to the motion of the socket on the ball. However, because of the construction of the ball assembly, the ball does not rotate when the socket rotates.

While the surfaces formed on the balls are shown, as being inwardly convex, these surfaces may be outwardly convex and the identical operational benefit will be achieved so long as the mating surfaces are complementary thereto.

The embodiments of the invention in which an exclusive property or privilege is claimed are defined as follows:

1. In a kit for a trailer ball assembly to be mounted on a tongue affixed to a vehicle, the kit including a plurality of interchangeable balls of differing spherical diameters, the plurality of balls corresponding to a plurality of tractor sockets, such that any selected one of the tractor sockets will be accommodated by the selection of a corresponding one of the plurality of balls for inclusion in the trailer ball assembly:

each ball being generally spherical in shape, having a first surface and a diametrically opposite second surface, and being sized to engage the corresponding selected trailer socket in a close mating relationship;

each ball being truncated at the first surface so that the first surface of every ball has the same shape and dimensions;

each ball having an opening extending diametrically therethrough from the center of the first surface to the opposite second surface of the ball;

a base having an upper surface for mating with the second surface of the selected one of the plurality of balls and a lower surface for mating with the tongue;

the base having an opening therethrough capable of being aligned with the opening in the selected ball; and a bolt sized to fit in the aligned openings in the selected ball and the base in order to permit assembling of the trailer ball assembly with the selected ball, the bolt having opposite ends, a head at one of the opposite ends of the bolt and a threaded portion adjacent the other of the opposite ends of the bolt, the head having an upper surface and a lower surface having a shape and dimensions essentially matching the shape and dimensions of the first surface of each ball such that, upon assembly, the lower surface is complementary to the first surface of the selected ball with which the head is in contact and the upper surface is essentially continuous with the spherical surface of the selected ball.

2. The invention of claim 1 wherein the first surfaces are frusto-conical in shape.

3. The invention of claim 1 wherein the ball is further truncated at the second surface diametrically opposite the first surface so that the second surface of every ball has the same shape and dimensions.

4. The invention of claim 3 wherein the corresponding first surfaces and second surfaces are of the same shape and dimensions.

* * * * *